United States Patent
He

(10) Patent No.: US 11,817,776 B2
(45) Date of Patent: Nov. 14, 2023

(54) POWER FACTOR CORRECTION CONTROL METHOD, APPARATUS, AND DEVICE, AND STORAGE MEDIUM

(71) Applicant: INSPUR SUZHOU INTELLIGENT TECHNOLOGY CO., LTD., Jiangsu (CN)

(72) Inventor: Chengrui He, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/790,862

(22) PCT Filed: Jul. 23, 2020

(86) PCT No.: PCT/CN2020/103693
§ 371 (c)(1),
(2) Date: Jul. 5, 2022

(87) PCT Pub. No.: WO2021/184626
PCT Pub. Date: Sep. 23, 2021

(65) Prior Publication Data
US 2023/0015830 A1    Jan. 19, 2023

(30) Foreign Application Priority Data
Mar. 20, 2020    (CN) .......................... 202010203075.5

(51) Int. Cl.
*H02M 1/42*    (2007.01)
*H02M 1/00*    (2006.01)
*H02M 1/14*    (2006.01)

(52) U.S. Cl.
CPC ....... *H02M 1/4208* (2013.01); *H02M 1/0025* (2021.05); *H02M 1/143* (2013.01)

(58) Field of Classification Search
CPC ...... H02M 1/0025; H02M 1/143; H02M 1/15; H02M 1/4208; H02M 1/126; H02M 1/00;
(Continued)

(56) References Cited

U.S. PATENT DOCUMENTS 8,116,710 B2 *    2/2012    Dent ................. H04L 25/03101
                                                            455/67.11
9,037,425 B2 *    5/2015    Yang ...................... H02H 7/261
                                                            702/59
(Continued)

FOREIGN PATENT DOCUMENTS

CN    102843024 A    12/2012
CN    102857087 A    1/2013
(Continued)

OTHER PUBLICATIONS

International Search Report of corresponding PCT application PCT/CN2020/103693, dated Dec. 21, 2020, 8 pages.
(Continued)

*Primary Examiner* — Gustavo A Rosario-Benitez
(74) *Attorney, Agent, or Firm* — COOPER LEGAL GROUP, LLC

(57) ABSTRACT

Disclosed are a Power Factor Correction (PFC) control method, apparatus, and device, and a computer-readable storage medium. The method includes: acquiring an input voltage value, input current value, and output voltage value from a PFC circuit (S101); acquiring a current reference value for current loop control by using a Prony's method according to the input voltage value, the output voltage value, and a preset voltage reference value (S102); and performing current loop control according to the current reference value and the input current value, and outputting a corresponding Pulse Width Modulation (PWM) signal, so (Continued)

as to control a switch tube in the PFC circuit to be correspondingly switched on or switched off (S103).

12 Claims, 3 Drawing Sheets

(58) Field of Classification Search
CPC .... H02M 1/0009; H02M 5/458; H02M 7/219; H02M 7/4835; H02M 7/49; H02M 7/5395; H02J 3/24; H02J 2203/20; H02J 3/38; H02J 3/00; H02J 3/002; H02J 3/18; H02J 2300/28; H02J 3/241; H02J 3/381; H02J 3/01; H02J 2203/10; H02J 3/242; H02J 3/382; H02J 3/46; H02J 3/48; H02J 13/00004; H02J 2300/22; H02J 2310/54; H02J 2310/58; H02J 3/004; H02J 3/144; H02J 3/26; H02J 3/32; H02J 3/386
See application file for complete search history.

(56) References Cited

U.S. PATENT DOCUMENTS

| | | | | |
|---|---|---|---|---|
| 9,450,411 B2* | 9/2016 | Chen | .............. | H02J 3/241 |
| 11,422,200 B2* | 8/2022 | Liu | .............. | H02M 7/219 |
| 2003/0094936 A1* | 5/2003 | Nam | .............. | G01R 23/02 |
| | | | | 324/76.29 |
| 2009/0099798 A1* | 4/2009 | Gong | .............. | H02J 3/242 |
| | | | | 702/57 |
| 2013/0321040 A1* | 12/2013 | Johal | .............. | H02J 3/144 |
| | | | | 327/113 |
| 2016/0352216 A1 | 12/2016 | Sonnaillon | | |
| 2017/0170745 A1* | 6/2017 | Wu | .............. | H02M 1/4225 |
| 2018/0091041 A1* | 3/2018 | Feng | .............. | H02M 1/4258 |
| 2018/0120818 A1* | 5/2018 | Omi | .............. | G05B 19/40937 |
| 2018/0278152 A1* | 9/2018 | Gritti | .............. | H02M 3/156 |
| 2019/0214826 A1* | 7/2019 | Du | .............. | H02J 3/241 |
| 2019/0222117 A1* | 7/2019 | Poon | .............. | H02M 1/12 |
| 2020/0091815 A1* | 3/2020 | Boncato | .............. | H02M 1/0025 |
| 2020/0313545 A1* | 10/2020 | Takegami | .............. | G01R 31/016 |
| 2020/0379495 A1* | 12/2020 | Wang | .............. | H02M 1/12 |

FOREIGN PATENT DOCUMENTS

| | | |
|---|---|---|
| CN | 103390995 A | 11/2013 |
| CN | 104868709 A | 8/2015 |
| CN | 204615631 U | 9/2015 |
| CN | 109884372 A | 6/2019 |
| CN | 110212743 A | 9/2019 |
| CN | 111313680 A | 6/2020 |

OTHER PUBLICATIONS

Written Opinion of corresponding PCT application PCT/CN2020/103693, dated Dec. 21, 2020, 9 pages.

Liang, et al., "A Detecting Method for Harmonic Current Using Simplified Prony's Spectral Estimation", DOI : 10. 19595/j. cnki. 1000-6753. tces . 1999, 4 pages.

* cited by examiner

POWER FACTOR CORRECTION CONTROL METHOD, APPARATUS, AND DEVICE, AND STORAGE MEDIUM

This application claims priority to Chinese Patent Application No. 202010203075.5, filed on Mar. 20, 2020, in China National Intellectual Property Administration and entitled "Power Factor Correction Control Method, Apparatus, and Device, and Storage Medium", which is hereby incorporated by reference in its entirety.

FIELD

The present disclosure relates to the technical field of power electronics, particularly to a Power Factor Correction (PFC) control method, apparatus, device, and computer-readable storage medium.

BACKGROUND

In the prior art, PFC control of a power supply unit performs calculation for voltage loop control, outputs a result to a current loop control for calculation, and finally controls a switch of a PFC circuit according to a calculation result for current loop control to adjust a Pulse Width Modulation (PWM) duty ratio to control controllable switches (such as Metal Oxide Semiconductor (MOS) transistors) of the PFC circuit, thereby implementing PFC.

As shown in FIG. 1, in a conventional double-loop control method for PFC, a voltage loop controller in a voltage loop compares an output voltage collected at a direct-current output end of PFC (i.e., a PFC circuit) with a voltage reference value to generate a control error value, and calculates an output result according to the control error value, thereby obtaining a current reference value in a current loop controller in a current loop by merging with an output result calculated by a feed-forward loop controller in the voltage loop according to an input voltage collected at an alternating-current input end of PFC. Then, the current loop controller compares an input current value of PFC to determine to adjust the PWM duty ratio, thereby implementing FPC control of the whole device. Since no processing is performed on an input frequency part in the voltage loop in the conventional PFC control method, there may be double-frequency ripples of the input voltage at the direct-current output end, which affects the system stability greatly, and reduces the PFC control accuracy.

Therefore, how to reduce frequency ripples in a direct-current output of a PFC circuit and improve the system stability as well as the PFC control accuracy is a problem urgent to be solved currently.

SUMMARY

An objective of the present disclosure is to provide a PFC control method, apparatus, device, and computer-readable storage medium, so as to reduce frequency ripples in a direct-current output of a PFC circuit and improve the system stability as well as the PFC control accuracy.

In order to solve the foregoing technical problem, the present disclosure provides a PFC control method, including:
acquiring an input voltage value, an input current value, and an output voltage value from a PFC circuit;
obtaining a current reference value for current loop control by using a Prony's method according to the input voltage value, the output voltage value, and a preset voltage reference value;
performing current loop control according to the current reference value and the input current value, and outputting a corresponding PWM signal, so as to control a switch tube in the PFC circuit to be correspondingly switched on or switched off.

Optionally, the obtaining a current reference value for current loop control by using a Prony's method according to the input voltage value, the output voltage value, and a preset voltage reference value includes:
performing voltage loop control according to the input voltage value, the output voltage value, and the preset voltage reference value to obtain an original current reference value;
calculating an angular frequency by using the Prony's method according to the original current reference value;
estimating an original current reference value at a next sampling moment of a present sampling moment according to the angular frequency and the original current reference value, and determining the estimated original current reference value as the current reference value.

Optionally, the calculating an angular frequency by using the Prony's method according to the original current reference value includes:
calculating the angular frequency by using $$\omega = \frac{1}{Ts} \cos^{-1}\left\{ \frac{\sum_{m-2}^{M-1}[g_{(m-1)} + g_{(m+1)}]^2}{2\sum_{m-2}^{M-1} g_m[g_{(m-1)} + g_{(m+1)}]} \right\}$$

according to the original current reference value, wherein $\omega$ represents the angular frequency, M represents a number of the original current reference value, $g_m$, represents an original current reference value at a sampling moment m, $g_{(m-1)}$ and $g_{(m+1)}$ represent original current reference values at a previous sampling moment and next sampling moment of the sampling moment m respectively, $g_{(M)}$ represents the original current reference value at the present sampling moment, and Ts represents a sampling period.

Optionally, the performing voltage loop control according to the input voltage value, the output voltage value, and the preset voltage reference value to obtain an original current reference value includes:
performing voltage loop control according to the output voltage value and the preset voltage reference value to obtain a first control voltage;
performing feed-forward loop control according to the input voltage value to obtain a second control voltage;
generating the original current reference value according to the first control voltage and the second control voltage.

The present disclosure also provides a PFC control apparatus, including:
an acquisition module, configured to acquire an input voltage value, input current value, and output voltage value from a PFC circuit;
an estimation module, configured to obtain a current reference value for current loop control by using a Prony's method according to the input voltage value, the output voltage value, and a preset voltage reference value;
a current loop control module, configured to perform current loop control according to the current reference value and the input current value, and output a corresponding PWM signal, so as to control a switch tube in the PFC circuit to be correspondingly switched on or switched off.

Optionally, the current loop control module includes:

a voltage loop control submodule, configured to perform voltage loop control according to the input voltage value, the output voltage value, and the preset voltage reference value to obtain an original current reference value;

a Prony calculation submodule, configured to calculate an angular frequency by using the Prony's method according to the original current reference value;

an estimation submodule, configured to estimate an original current reference value at a next sampling moment of a present sampling moment according to the angular frequency and the original current reference value, and determine the estimated original current reference value as the current reference value.

Optionally, the Prony calculation submodule is specifically configured to:

calculate the angular frequency by using $$\omega = \frac{1}{T_s}\cos^{-1}\left\{\frac{\sum_{m=2}^{M-1}[g_{(m-1)} + g_{(m+1)}]^2}{2\sum_{m=2}^{M-1}g_m[g_{(m-1)} + g_{(m+1)}]}\right\}$$

according to the original current reference value, wherein $\omega$ represents the angular frequency, M represents a number of the original current reference value, $g_m$ represents an original current reference value at a sampling moment m, $g_{(m-1)}$ and $g_{(m+1)}$ represent original current reference values at a previous sampling moment and next sampling moment of the sampling moment m respectively, $g_{(M)}$ represents the original current reference value at the present sampling moment, and Ts represents a sampling period.

Optionally, the voltage loop control submodule includes:

a voltage loop control unit, configured to perform voltage loop control according to the output voltage value and the preset voltage reference value to obtain a first control voltage;

a feed-forward loop control unit, configured to perform feed-forward loop control according to the input voltage value to obtain a second control voltage;

a Proportion Integration Differentiation (PID) control unit, configured to generate the original current reference value according to the first control voltage and the second control voltage.

The present disclosure also provides a PFC control device, including:

a memory, configured to store a computer program; and a processor, configured to execute the computer program to implement any steps of the PFC control method as described above.

In addition, the present disclosure also provides a computer-readable storage medium, storing a computer program that is executed by a processor to implement any steps of the PFC control method as described above.

The present disclosure provides a PFC control method, including: acquiring an input voltage value, input current value, and output voltage value from a PFC circuit; acquiring a current reference value for current loop control by using a Prony's method according to the input voltage value, the output voltage value, and a preset voltage reference value; and performing current loop control according to the current reference value and the input current value, and outputting a corresponding PWM signal, so as to control a switch tube in the PFC circuit to be correspondingly switched on or switched off.

It can be seen that, according to the present disclosure, the current reference value for current loop control is acquired by using the Prony's method according to the input voltage value, the output voltage value, and the preset voltage reference value, a frequency of an input voltage and a range of band-stop filtering are determined by using the Prony's method, and then a corresponding compensation may be injected according to the calculated current reference value, whereby frequency ripples in a direct-current output of the PFC circuit are reduced, and the system stability and the PFC control accuracy are improved. In addition, the present disclosure also provides a PFC control apparatus and device and a computer-readable storage medium, which have the foregoing beneficial effects.

BRIEF DESCRIPTION OF THE DRAWINGS

In order to describe the technical solutions in embodiments of the present disclosure or the prior art more clearly, the drawings needed to be used in descriptions about the embodiments or the prior art will be briefly introduced below. Apparently, the drawings in the description below are merely embodiments of the present disclosure. Those ordinarily skilled in the art may further obtain other drawings according to the provided drawings without creative work.

DETAILED DESCRIPTION

In order to make the objective, technical solutions, and advantages of the embodiments of the present application clearer, the technical solutions in the embodiments of the present application will be described clearly and completely below in combination with the drawings in the embodiments of the present application. Based on the embodiments of the present invention, all other embodiments obtained by those skilled in the art without creative work shall fall within the protection scope of the present invention.

Figure 2:
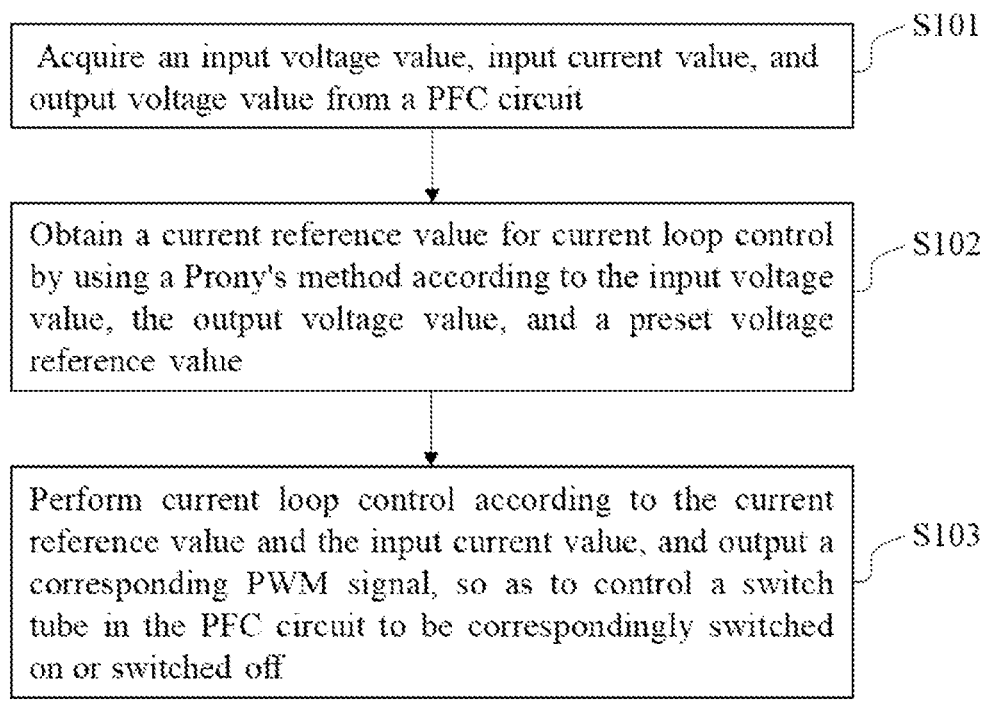
FIG. 2 is a flowchart of a PFC control method according to an embodiment of the present disclosure.

Referring to FIG. 2, FIG. 2 is a flowchart of a PFC control method according to an embodiment of the present disclosure. The method may include the following steps.

Step 101: acquire an input voltage value, an input current value, and an output voltage value from a PFC circuit.

The PFC circuit in this step may be a circuit configured to realize a PFC function. A specific circuit structure of the PFC circuit in this step may be customized by a designer according to application scenarios and user requirements, for example, the structure may be implemented in the same or similar manner as the PFC circuit in the prior art. For example, the PFC circuit may include a rectifier circuit (such as a bridge rectifier) and a main PFC circuit, or the PFC circuit may include the main PFC circuit only. No limits are made thereto in the present embodiment, as long as switch transistors (such as MOS transistors) in the main PFC circuit may be correspondingly switched on or switched off according to a PWM signal received by a control end, thereby realizing the PFC function.

It can be understood that, in this step, a processor (such as a Micro Controller Unit (MCU) or a Digital Signal Processor (DSP)) controlling the PFC circuit may acquire circuit parameters needed to control the PFC circuit, i.e., an input voltage value, an input current value, and an output voltage value of the PFC circuit.

Figure 1:
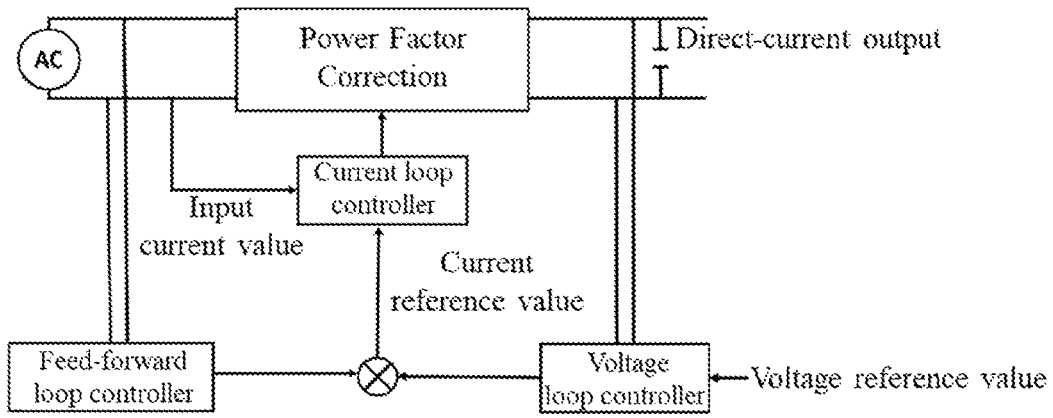
FIG. 1 is a control block diagram of a PFC control method according to the prior art.

Correspondingly, the input voltage value, the input current value, and the output voltage value acquired by the processor in this step may correspond to the circuit structure of the PFC circuit. As shown in FIG. 1, when the PFC circuit includes a rectifier circuit, namely when an alternating current output by an alternating-current power supply (AC) may be directly converted into a direct-current output by the PFC circuit, the input voltage value, the input current value, and the output voltage value in this step may be an alternating-current voltage value and an alternating current value input into the PFC circuit and a direct-current voltage value output by the PFC circuit. When the PFC circuit does not include a rectifier circuit, namely when the alternating current of the alternating-current power supply is input into the PFC circuit through an external rectifier circuit, the input voltage value, the input current value, and the output voltage value in this step may be a direct-current voltage value and a direct current value output by the rectifier circuit and a direct-current voltage value output by the PFC circuit. No limits are made thereto in the present embodiment.

Step 102: obtain a current reference value for current loop control by using a Prony's method according to the input voltage value, the output voltage value, and a preset voltage reference value.

It can be understood that a purpose of this step may be that the processor introduces the Prony's method into a process of performing voltage loop control according to the input voltage value, the output voltage value, and the preset voltage reference value to determine a frequency of an input voltage and a range of band-stop filtering by using the Prony's method. Therefore, compared with calculating a current reference value for current loop control in conventional voltage loop control, calculating a current reference value in this step can be additionally injected with compensation for reducing direct-current output ripples of the PFC circuit.

Specifically, the specific mode in this step for the processor to acquire the current reference value for current loop control by using the Prony's method according to the input voltage value, the output voltage value, and the preset voltage reference value may be set by the designer according to application scenarios and user requirements. For example, the processor, after calculating a current value (original current reference value) at a present sampling moment according to the input voltage value, the output voltage value, and the preset voltage reference value in the same or similar manner as the voltage loop control in the prior art, may calculate an angular frequency ($\omega$), i.e., $\omega=2\pi f$, corresponding to a frequency (f) of an input voltage by using the Prony's method according to calculated current values at multiple sampling moments, thereby calculating a current value at a next sampling moment corresponding to the current value at the present sampling moment, i.e., a current reference value output to current loop control, according to the calculated angular frequency. That is, the angular frequency calculated by the Prony's method corresponds to the input voltage value and the output voltage value. That is, this step may include: performing voltage loop control according to the input voltage value, the output voltage value, and the preset voltage reference value to obtain an original current reference value; calculating an angular frequency by using the Prony's method according to the original current reference value; and estimating the original current reference value at a next sampling moment of a present sampling moment according to the angular frequency and the original current reference value, and the estimated original current reference value is determined as the current reference value.

Alternatively, the processor, before calculating the current reference value in the same or similar manner as the current reference value calculation in the prior art, may estimate a control output at a next output moment of a present output moment of voltage loop control and/or feed-forward loop control by using the Prony's method. As shown in FIG. 1, when voltage loop control includes voltage loop control and feed-forward loop control, the processor, after calculating a control output (first original control output) of the voltage loop control and a control output (second original control output) of the feed-forward loop control in the same or similar manner as voltage loop control and feed-forward loop control in the prior art, may calculate an angular frequency (first angular frequency) corresponding to the first control output and an angular frequency (second angular frequency) corresponding to the second control output by using the Prony's method respectively, thereby estimating control outputs (the first control output and second control output) of voltage loop control and feed-forward loop control at a next output moment of a present output moment respectively. That is, this step may include: performing voltage loop control according to the output voltage value and the preset voltage reference value to obtain a first original control output; calculating a first angular frequency by using the Prony's method according to the first original control output; estimating a first original control output at a next output moment of a present output moment according to the first angular frequency and the first original control output, and determining the estimated first original control output as a first control output; performing feed-forward loop control according to the input voltage value to obtain a second original control output; calculating a second angular frequency by using the Prony's method according to the second original control output; estimating a second original control output at the next output moment of the present output moment according to the second angular frequency and the second original control output, and determining the estimated second original control output as a second control output; and calculating the current reference value for current loop control according to the first control output and the second control output. That is, the first angular frequency calculated by the Prony's method corresponds to the output voltage value, and the second angular frequency calculated by the Prony's method corresponds to the input voltage value.

Step 103: perform current loop control according to the current reference value and the input current value, and output a corresponding PWM signal, so as to control a switch tube in the PFC circuit to be correspondingly switched on or switched off.

It can be understood that the current reference value for current loop control in this step includes compensation for reducing direct-current output ripples of the PFC circuit. That is, the current reference value at a present sampling moment for current loop control in this step is an estimated current reference value at a next sampling moment for current loop control in the prior art. Therefore, in this step, when the processor performs current loop control according to the current reference value and the input current value, and outputs the corresponding PWM signal to the switch transistors in the PFC circuit to correspondingly switch on or switch off the switch transistors to complete PFC, direct-current output ripples of the PFC circuit may be reduced.

Figure 4:
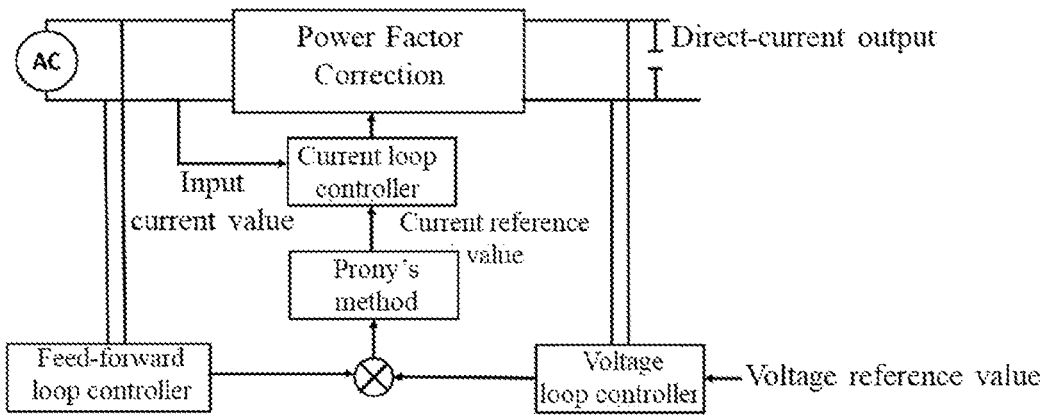
FIG. 4 is a control block diagram of another PFC control method according to an embodiment of the present disclosure.

Specifically, the specific mode in the present embodiment for the processor to perform current loop control according to the current reference value and the input current value and outputs the corresponding PWM signal may be set by the designer according to application scenarios and user requirements. For example, the operation may be implemented in a manner the same as or similar to that for current loop control in the prior art. As shown in FIGS. 1 and 4, the processor may compare the current reference value with the input current value of the PFC circuit through a current loop controller, and calculate and adjust a duty ratio of the PWM signal output to a control end of the switch transistors in the PFC circuit.

In the present embodiment of the present disclosure, the current reference value for current loop control is acquired by using the Prony's method according to the input voltage value, the output voltage value, and the preset voltage reference value, a frequency of an input voltage and a range of band-stop filtering are determined by using the Prony's method, and then corresponding compensation may be injected according to the calculated current reference value, whereby reducing frequency ripples in a direct-current output of the PFC circuit, and improving the system stability and the PFC control accuracy.

Figure 3:
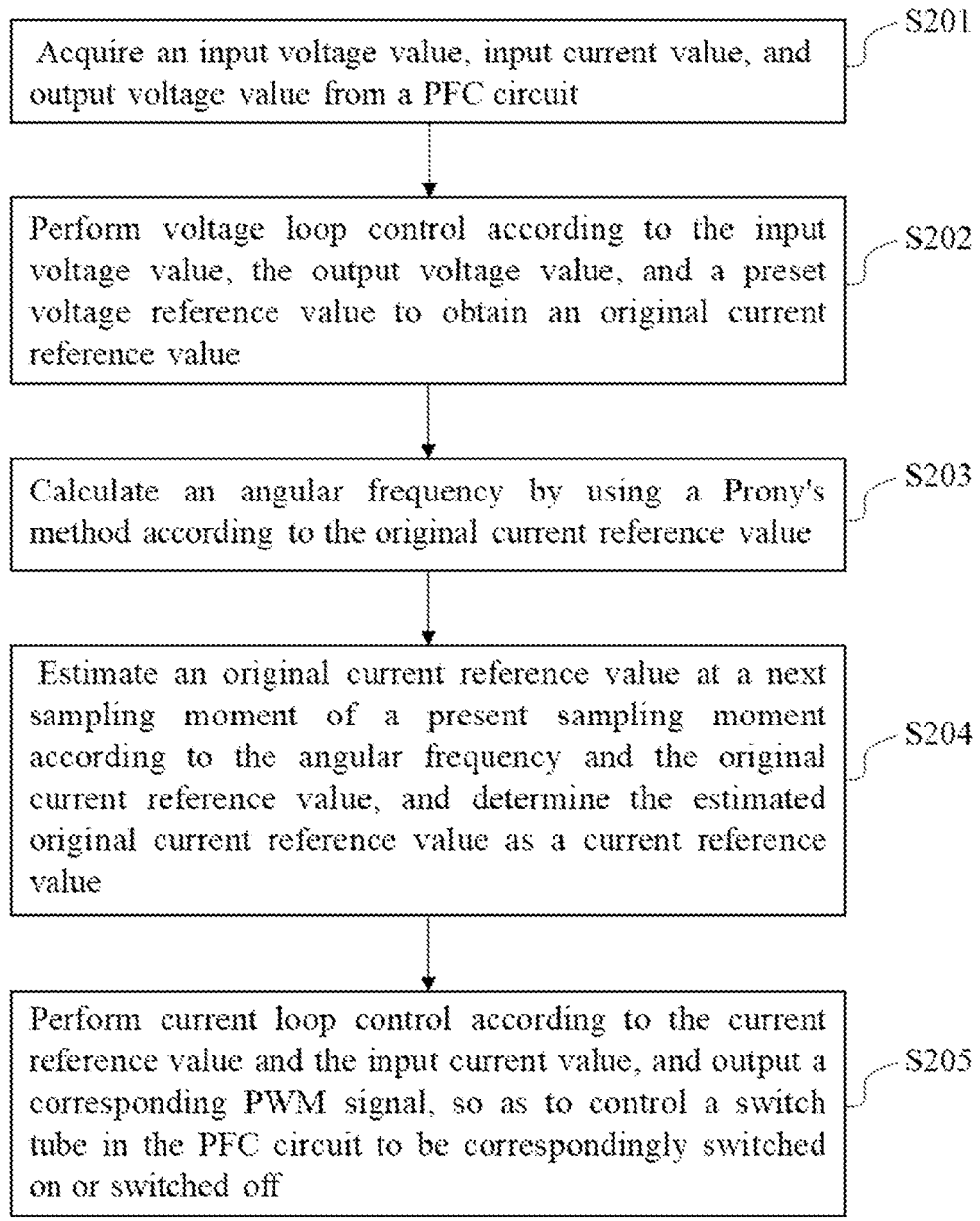
FIG. 3 is a flowchart of another PFC control method according to an embodiment of the present disclosure.

Referring to FIG. 3, FIG. 3 is a flowchart of another PFC control method according to an embodiment of the present disclosure. The method may include the following steps.

Step 201: acquire an input voltage value, an input current value, and an output voltage value from a PFC circuit.

Specifically, the PFC circuit in the present embodiment may include a rectifier circuit. That is, the input voltage value, the input current value, and the output voltage value in this step may be an alternating-current voltage value and alternating current value input into the PFC circuit and a direct-current voltage value output by the PFC circuit.

Step 202: perform voltage loop control according to the input voltage value, the output voltage value, and the preset voltage reference value to obtain an original current reference value.

It can be understood that, in this step, a processor (such as an MCU or a DSP) may perform voltage loop control according to the input voltage value, the output voltage value, and the preset voltage reference value, thereby calculating an original current reference value, i.e., a current value output to current loop control in the prior art, such as a reference current value output to a current loop controller in FIG. 1.

Specifically, the specific mode in this step for the processor to perform voltage loop control according to the input voltage value, the output voltage value, and a preset voltage reference value to obtain an original current reference value may specifically be implemented in the same or similar manner as the voltage loop control in the prior art. As shown in FIG. 4, when voltage loop control includes feed-forward loop control, the processor may compare a voltage value (output voltage value) of a direct-current output with a voltage reference value (preset voltage reference value) through a voltage loop controller to generate a control error value (first control voltage), and generate a control voltage value (second control voltage) for voltage feed-forward control through a feed-forward loop controller by using an alternating-current voltage value (input voltage value) output by an alternating-current power supply (AC), thereby generating the original current reference value through a PID controller according to the first control voltage and the second control voltage.

That is, this step may include the following steps: performing voltage loop control according to the output voltage value and the preset voltage reference value to obtain a first control voltage; performing feed-forward loop control according to the input voltage value to obtain a second control voltage; and generating the original current reference value according to the first control voltage and the second control voltage.

Correspondingly, when voltage loop control does not include feed-forward loop control, the processor may perform voltage loop control according to the output voltage value and the preset voltage reference value to obtain a third control voltage, and generate the original current reference value according to the third control voltage and the input voltage value.

Step 203: calculate an angular frequency by using the Prony's method according to the original current reference value.

The angular frequency ($\omega$) calculated in this step may be a parameter corresponding to a frequency (f) of an input voltage, i.e., $\omega=2\pi f$. The angular frequency may correspond to the input voltage value and the output voltage value of the PFC circuit.

It can be understood that a purpose of this step may be that, by using original current reference values acquired at multiple sample points, frequencies (i.e., angular frequencies) corresponding to sampling points of these sampling moments are calculated by a Prony's method, thereby determining voltage frequencies corresponding to the calculated angular frequencies as frequencies of the input voltage.

Correspondingly, a specific selection mode for the original current reference value needed by the calculation of the angular frequency in this step is not limited in the present embodiment. For example, the original current reference value needed by the calculation of the angular frequency may be the original current reference value at a present sampling moment and original current reference values at multiple sampling moments closest to the present sampling moment, or may be original current reference values at multiple sampling moments before the present sampling moment. No limits are made thereto in the present embodiment.

Specifically, in this step, the processor may calculate the angular frequency $\omega$ by using $$\omega = \frac{1}{Ts}\cos^{-1}\left\{\frac{\sum_{m-2}^{M-1}[g_{(m-1)} + g_{(m+1)}]^2}{2\sum_{m-2}^{M-1}g_m[g_{(m-1)} + g_{(m+1)}]}\right\}$$

according to the original current reference value at a present sampling moment and original current reference values at multiple sampling moments closest to the present sampling moment, wherein $\omega$ represents the angular frequency, M represents a number of the original current reference values, $g_m$ represents an original current reference value at a sampling moment m, $g_{(m-1)}$ and $g_{(m+1)}$ represent original current reference values at a previous sampling moment and next sampling moment of the sampling moment m respectively, $g_{(M)}$ represents the original current reference value at the present sampling moment, and Ts represents a sampling period.

$$f = \frac{\omega}{2\pi},$$

wherein f represents a voltage frequency, i.e., a determined frequency of an input voltage.

Step 204: estimate the original current reference value at a next sampling moment of a present sampling moment according to the angular frequency and the original current reference value, and determine the estimated original current reference value as the current reference value.

It can be understood that a purpose of this step may be that the processor estimates and calculates an original current reference value at a next sampling moment of a present sampling moment according to the calculated angular frequency and the original current reference value at the present sampling moment, and determines the estimated original current reference value at the next sampling moment as a current reference value needed to be input to current loop control.

Specifically, in this step, since a frequency (i.e., angular frequency) corresponding to a variation of the original current reference value has been calculated, the original current reference value at the next sampling moment may be estimated by using $I_{n+1}=I_n \sin(\omega t)$ according to the angular frequency and the original current reference value at the present sampling moment, wherein $I_{n+1}$ represents the original current reference value at the next sampling moment, $I_n$ represents the original current reference value at the present sampling moment, $\omega$ represents the angular frequency calculated by the Prony's method, and t represents a time difference between the next sampling moment and the present sampling moment, i.e., a sampling period.

Step 205: perform current loop control according to the current reference value and the input current value, and output a corresponding PWM signal, so as to control switch transistors in the PFC circuit to be correspondingly switched on or switched off.

Specifically, this step is similar to step 103, and will not be elaborated herein.

In the present embodiment of the present disclosure, the original current reference value at the next sampling moment of the present sampling moment is estimated as the current reference value according to the angular frequency calculated by the Prony's method and the original current reference value at the present sampling moment, whereby the Prony's method needs to be used only once every time when a current reference value is calculated, and the calculation amount is reduced. Moreover, a frequency of an input voltage and a range of band-stop filtering are determined according to the angular frequency calculated by the Prony's method, and then a corresponding compensation may be injected according to the calculated current reference value, whereby frequency ripples in a direct-current output of the PFC circuit are reduced, and the stability of a power supply unit and the PFC control accuracy are improved.

Figure 5:
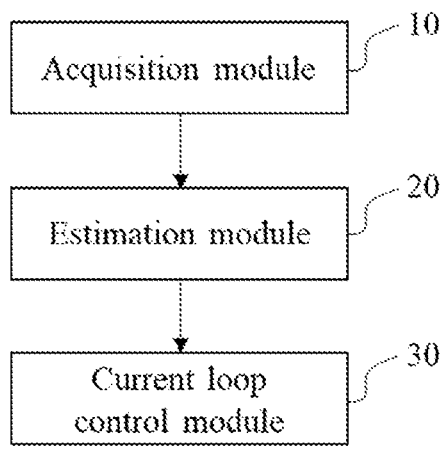
FIG. 5 is a structural block diagram of a PFC control apparatus according to an embodiment of the present disclosure.

Referring to FIG. 5, FIG. 5 is a structural block diagram of a PFC control apparatus according to an embodiment of the present disclosure. The apparatus may include:

an acquisition module 10, configured to acquire an input voltage value, an input current value, and an output voltage value from a PFC circuit;

an estimation module 20, configured to obtain a current reference value for current loop control by using a Prony's method according to the input voltage value, the output voltage value, and a preset voltage reference value;

a current loop control module 30, configured to perform current loop control according to the current reference value and the input current value, and output a corresponding PWM signal, so as to control a switch tube in the PFC circuit to be correspondingly switched on or switched off.

Optionally, the current loop control module 30 may include:

a voltage loop control submodule, configured to perform voltage loop control according to the input voltage value, the output voltage value, and the preset voltage reference value to obtain an original current reference value;

a Prony calculation submodule, configured to calculate an angular frequency by using the Prony's method according to the original current reference value;

an estimation submodule, configured to estimate an original current reference value at a next sampling moment of a present sampling moment according to the angular frequency and the original current reference value, and determine the estimated original current reference value as the current reference value.

Optionally, the Prony calculation submodule is specifically configured to: calculate the angular frequency by using $$\omega = \frac{1}{Ts}\cos^{-1}\left\{\frac{\sum_{m-2}^{M-1}[g_{(m-1)}+g_{(m+1)}]^2}{2\sum_{m-2}^{M-1}g_m[g_{(m-1)}+g_{(m+1)}]}\right\}$$

according to the original current reference value, wherein $\omega$ represents the angular frequency, M represents a number of the original current reference value, $g_m$ represents an original current reference value at a sampling moment m, $g_{(m-1)}$ and $g_{(m+1)}$ represent original current reference values at a previous sampling moment and next sampling moment of the sampling moment m respectively, $g_{(M)}$ represents the original current reference value at the present sampling moment, and Ts represents a sampling period.

Optionally, the voltage loop control submodule includes:

a voltage loop control unit, configured to perform voltage loop control according to the output voltage value and the preset voltage reference value to obtain a first control voltage;

a feed-forward loop control unit, configured to perform feed-forward loop control according to the input voltage value to obtain a second control voltage;

a PID control unit, configured to generate the original current reference value according to the first control voltage and the second control voltage.

In the present embodiment of the present disclosure, the estimation module 20 acquires the current reference value for current loop control by using the Prony's method according to the input voltage value, the output voltage value, and the preset voltage reference value, a frequency of an input voltage and a range of band-stop filtering are determined by using the Prony's method, and then a corresponding compensation may be injected according to the calculated current reference value, whereby frequency ripples in a direct-current output of the PFC circuit are reduced, and the system stability and the PFC control accuracy are improved.

An embodiment of the present disclosure also provides a PFC control device, including a processor and a memory. The memory is configured to store a computer program. The processor is configured to execute the computer program to implement the steps of the PFC control method provided in the above-mentioned embodiment.

In the present embodiment, the memory includes a readable storage medium of at least one type. The readable storage medium includes a flash memory, a hard disk, a multimedia card, a card memory (such as a Secure Digital (SD) or Data Register (DX) memory), a magnetic memory, a magnetic disk, an optical disk, etc. In some embodiments, the memory may be an internal memory cell of the PFC control device. In some other embodiments, the memory may be an external memory device of the PFC control device, such as a plug-in hard disk, a Smart Media Card (SMC), an SD card, and a flash card. Further, the memory may include an internal memory cell as well as external memory device of the PFC control device. The memory may be configured not only to store application software installed in the PFC control device and various data, such as a code executing a PFC control method, but also to temporarily store data that has been output or to be output.

In some embodiments, the processor in the present embodiment may be a Central Processing Unit (CPU), a controller, an MCU, a microprocessor, or another data processing chip, and is configured to run a program code or processing data stored in the memory, such as a program code executing the PFC control method.

In addition, an embodiment of the present disclosure also provides a computer-readable storage medium, storing a computer program that is executed by a processor to implement the steps of the PFC control method provided in the above-mentioned embodiment.

The computer-readable storage medium may include various media capable of storing program codes, such as a U disk, a mobile hard disk, a Read-Only Memory (ROM), a Random Access Memory (RAM), a magnetic disk, or an optical disk.

All the embodiments in this specification are described in a progressive manner. Contents mainly described in each embodiment are different from those described in other embodiments. Since the apparatus, the device and the computer-readable storage medium disclosed in the embodiments correspond to the method disclosed in the embodiment, the descriptions therefor are relatively simple. The relevant parts may be described with reference to the method section.

The skilled person may further realize that the units and algorithmic steps of each example described in conjunction with the embodiments disclosed herein are capable of being implemented in electronic hardware, computer software, or a combination of both, and that the composition and steps of each example have been described generally by function in the above description for the purpose of clearly illustrating the interchangeability of hardware and software. Whether these functions are performed in hardware or software depends on the particular application and design constraints of the technical solution. The skilled person may use different methods to implement the described functions for each particular application, but such implementation should not be considered as going beyond the scope of the present invention.

The PFC control method, apparatus, and device and computer-readable storage medium provided in the present disclosure are introduced above in detail. Specific examples are applied in this specification to illustrate the principle and embodiments of the present invention, and the above description of the embodiments is only used to help understand the method of the present invention and the core idea thereof. It should be noted that for a person of ordinary skill in the art, several improvements and modifications can be made to the present invention without departing from the principle of the present invention, and these improvements and modifications also fall within the scope of protection of the claims of the present invention.

What is claimed is:

1. A Power Factor Correction (PFC) control method, comprising:
    acquiring an input voltage value, an input current value, and an output voltage value from a PFC circuit;
    obtaining a current reference value for current loop control by using a Prony's method according to the input voltage value, the output voltage value, and a preset voltage reference value; and
    performing current loop control according to the current reference value and the input current value, and outputting a corresponding Pulse Width Modulation (PWM) signal, so as to control switch transistors in the PFC circuit to be correspondingly switched on or switched off;
    wherein the obtaining the current reference value for current loop control by using the Prony's method according to the input voltage value, the output voltage value, and the preset voltage reference value comprises:
        performing voltage loop control according to the input voltage value, the output voltage value, and the preset voltage reference value to obtain an original current reference value;
        calculating an angular frequency by using the Prony's method according to the original current reference value; and
        estimating an original current reference value at a next sampling moment of a present sampling moment according to the angular frequency and the original current reference value, and determining the estimated original current reference value as the current reference value.

2. The PFC control method according to claim 1, wherein the calculating the angular frequency by using the Prony's method according to the original current reference value comprises:
    calculating the angular frequency by using $$\omega = \frac{1}{Ts}\cos^{-1}\left\{\frac{\sum_{m=2}^{M-1}[g_{(m-1)} + g_{(m+1)}]^2}{2\sum_{m=2}^{M-1}g_m[g_{(m-1)} + g_{(m+1)}]}\right\}$$

according to the original current reference value, wherein $\omega$ represents the angular frequency, M represents a number of the original current reference value, $g_m$ represents an original current reference value at a sampling moment m, $g_{(m-1)}$ and $g_{(m+1)}$ represent original current reference values at a previous sampling moment and next sampling moment of the sampling moment m respectively, $g_{(M)}$ represents the original current reference value at the present sampling moment, and Ts represents a sampling period.

3. The PFC control method according to claim 1, wherein the performing voltage loop control according to the input voltage value, the output voltage value, and the preset voltage reference value to obtain the original current reference value comprises:

performing voltage loop control according to the output voltage value and the preset voltage reference value to obtain a first control voltage;

performing feed-forward loop control according to the input voltage value to obtain a second control voltage; and generating the original current reference value according to the first control voltage and the second control voltage.

4. The PFC control method according to claim 1, wherein the original current reference value is the original current reference value at the present sampling moment and original current reference values at multiple sampling moments closest to the present sampling moment.

5. A Power Factor Correction (PFC) control device, comprising:

a memory, configured to store a computer program; and a processor, configured to execute the computer program to implement operations comprising:

acquiring an input voltage value, an input current value, and an output voltage value from a PFC circuit;

obtaining a current reference value for current loop control by using a Prony's method according to the input voltage value, the output voltage value, and a preset voltage reference value; and performing current loop control according to the current reference value and the input current value, and outputting a corresponding Pulse Width Modulation (PWM) signal, so as to control switch transistors in the PFC circuit to be correspondingly switched on or switched off;

wherein the obtaining the current reference value for current loop control by using the Prony's method according to the input voltage value, the output voltage value, and the preset voltage reference value comprises:

performing voltage loop control according to the input voltage value, the output voltage value, and the preset voltage reference value to obtain an original current reference value;

calculating an angular frequency by using the Prony's method according to the original current reference value; and estimating an original current reference value at a next sampling moment of a present sampling moment according to the angular frequency and the original current reference value, and determining the estimated original current reference value as the current reference value.

6. The PFC control device according to claim 5, wherein the calculating the angular frequency by using the Prony's method according to the original current reference value comprises:

calculating the angular frequency by using $$\omega = \frac{1}{Ts}\cos^{-1}\left\{\frac{\sum_{m-2}^{M-1}[g_{(m-1)} + g_{(m+1)}]^2}{2\sum_{m-2}^{M-1}g_m[g_{(m-1)} + g_{(m+1)}]}\right\}$$

according to the original current reference value, wherein ω represents the angular frequency, M represents a number of the original current reference value, $g_m$ represents an original current reference value at a sampling moment m, $g_{(m-1)}$ and $g_{(m+1)}$ represent original current reference values at a previous sampling moment and next sampling moment of the sampling moment m respectively, $g_{(M)}$ represents the original current reference value at the present sampling moment, and Ts represents a sampling period.

7. The PFC control device according to claim 5, wherein the performing voltage loop control according to the input voltage value, the output voltage value, and the preset voltage reference value to obtain the original current reference value comprises:

performing voltage loop control according to the output voltage value and the preset voltage reference value to obtain a first control voltage;

performing feed-forward loop control according to the input voltage value to obtain a second control voltage; and generating the original current reference value according to the first control voltage and the second control voltage.

8. The PFC control device according to claim 5, wherein the original current reference value is the original current reference value at the present sampling moment and original current reference values at multiple sampling moments closest to the present sampling moment.

9. A non-transitory computer-readable storage medium, storing a computer program that is executed by a processor to implement operations comprising:

acquiring an input voltage value, an input current value, and an output voltage value from a PFC circuit;

obtaining a current reference value for current loop control by using a Prony's method according to the input voltage value, the output voltage value, and a preset voltage reference value; and performing current loop control according to the current reference value and the input current value, and outputting a corresponding Pulse Width Modulation (PWM) signal, so as to control switch transistors in the PFC circuit to be correspondingly switched on or switched off;

wherein the obtaining the current reference value for current loop control by using the Prony's method according to the input voltage value, the output voltage value, and the preset voltage reference value comprises:

performing voltage loop control according to the input voltage value, the output voltage value, and the preset voltage reference value to obtain an original current reference value;

calculating an angular frequency by using the Prony's method according to the original current reference value; and estimating an original current reference value at a next sampling moment of a present sampling moment according to the angular frequency and the original current reference value, and determining the estimated original current reference value as the current reference value.

10. The non-transitory computer-readable storage medium according to claim 9, wherein the calculating the angular frequency by using the Prony's method according to the original current reference value comprises:

calculating the angular frequency by using $$\omega = \frac{1}{Ts}\cos^{-1}\left\{\frac{\sum_{m-2}^{M-1}[g_{(m-1)} + g_{(m+1)}]^2}{2\sum_{m-2}^{M-1}g_m[g_{(m-1)} + g_{(m+1)}]}\right\}$$

according to the original current reference value, wherein $\omega$ represents the angular frequency, M represents a number of the original current reference value, $g_m$ represents an original current reference value at a sampling moment m, $g_{(m-1)}$ and $g_{(m+1)}$ represent original current reference values at a previous sampling moment and next sampling moment of the sampling moment m respectively, $g_{(M)}$ represents the original current reference value at the present sampling moment, and Ts represents a sampling period.

11. The non-transitory computer-readable storage medium according to claim 9, wherein the performing voltage loop control according to the input voltage value, the output voltage value, and the preset voltage reference value to obtain the original current reference value comprises:

performing voltage loop control according to the output voltage value and the preset voltage reference value to obtain a first control voltage;

performing feed-forward loop control according to the input voltage value to obtain a second control voltage; and generating the original current reference value according to the first control voltage and the second control voltage.

12. The non-transitory computer-readable storage medium according to claim 9, wherein the original current reference value is the original current reference value at the present sampling moment and original current reference values at multiple sampling moments closest to the present sampling moment.

\* \* \* \* \*